United States Patent
Lee et al.

(10) Patent No.: US 10,493,599 B2
(45) Date of Patent: Dec. 3, 2019

(54) SYSTEM AND METHOD FOR REMOTELY CONTROLLING JIG USING WIRELESS MAGNETIC SENSOR

(71) Applicant: SUN HST Co., Ltd.

(72) Inventors: Jin Yong Lee, Ulsan (KR); Young Kuk Kwon, Busan (KR); Myoung Hoon Choi, Busan (KR); Su Jin Lee, Ulsan (KR)

(*) Notice: Subject to any disclaimer, the term of this patent is extended or adjusted under 35 U.S.C. 154(b) by 0 days.

(21) Appl. No.: 15/972,177

(22) Filed: May 6, 2018

(65) Prior Publication Data
US 2019/0070713 A1    Mar. 7, 2019

(30) Foreign Application Priority Data

Sep. 5, 2017   (KR) ................. 10-2017-0113148

(51) Int. Cl.
| | |
|---|---|
| *B25B 5/00* | (2006.01) |
| *B23K 26/38* | (2014.01) |
| *B23Q 1/66* | (2006.01) |
| *B25B 11/00* | (2006.01) |

(52) U.S. Cl.
CPC ............ *B25B 5/003* (2013.01); *B23K 26/38* (2013.01); *B23Q 1/66* (2013.01); *B25B 11/002* (2013.01); *B23P 2700/50* (2013.01)

(58) Field of Classification Search
None
See application file for complete search history.

(56) References Cited

U.S. PATENT DOCUMENTS

| | | | |
|---|---|---|---|
| 2004/0026180 A1* | 2/2004 | Baker | B66F 3/46 187/285 |
| 2013/0201316 A1* | 8/2013 | Binder | H04L 67/12 348/77 |
| 2015/0232309 A1* | 8/2015 | Jaipaul | B66F 7/04 414/800 |
| 2016/0052757 A1* | 2/2016 | De Jong | B66F 3/24 254/89 H |

FOREIGN PATENT DOCUMENTS

KR    10-0401628    10/2003

OTHER PUBLICATIONS

English Specification of 10-0401628.

* cited by examiner

*Primary Examiner* — Ziaul Karim
(74) *Attorney, Agent, or Firm* — Antonio Ha & U.S. Patent, LLC

(57) ABSTRACT

A remote jig control system may comprise a jig configured to place a car body to a particular position, a wireless magnetic sensor installed in the jig, a control panel wirelessly connected with the wireless magnetic sensor via first wireless communication to receive state information about the jig from the wireless magnetic sensor, a gateway connected with the control panel via the first wireless communication to receive the state information, a user terminal connected with the gateway via second wireless communication to receive the state information; and monitoring server configured to receive the state information from the gateway and store the state information, wherein the control panel is configured to be controlled through the user terminal to generate a jig control signal corresponding to the state information.

9 Claims, 9 Drawing Sheets

SYSTEM AND METHOD FOR REMOTELY CONTROLLING JIG USING WIRELESS MAGNETIC SENSOR

CROSS-REFERENCE TO RELATED APPLICATIONS

This patent application claims priority under 35 U.S.C. § 119 to Korean Patent Application No. 10-2017-0113148, filed on Sep. 5, 2017, in the Korean Intellectual Property Office, the disclosure of which is incorporated by reference herein in its entirety.

TECHNICAL FIELD

Various embodiments of the present disclosure concern systems and methods for remotely controlling jigs using wireless magnetic sensors, and more specifically, to remote jig control systems and methods capable of wirelessly controlling jigs used for manufacturing vehicles using user terminals.

DISCUSSION OF RELATED ART

Jigs used in automobile production sites are assistant means to quickly and precisely place car bodies to desired positions for welding or assembling the car bodies.

Such a jig adopts an air pressure actuator to control the operation of clamps. Workers may control the operation of the clamps by monitoring the position of the air pressure actuator through a magnetic sensor attached onto the air pressure actuator.

Thus, workers are forced to be positioned close to the jig, which may subject them to danger or hassles. Further, the conventional jig control adopts wired magnetic sensors that may involve an inconvenient wiring job and wire disconnections and thus a frequent replacing of sensors.

SUMMARY

According to an embodiment of the present disclosure, a remote jig control system comprises a jig configured to place a car body to a particular position, a wireless magnetic sensor installed in the jig, a control panel wirelessly connected with the wireless magnetic sensor via first wireless communication to receive state information about the jig from the wireless magnetic sensor, a gateway connected with the control panel via the first wireless communication to receive the state information, a user terminal connected with the gateway via second wireless communication to receive the state information, and a monitoring server configured to receive the state information from the gateway and store the state information, wherein the control panel is configured to be controlled through the user terminal to generate a jig control signal corresponding to the state information.

The user terminal may be configured to receive, through the gateway, the state information stored in the monitoring server and display a state of the jig.

The jig may include a clamp configured to clamp the car body, an air pressure actuator connected with the clamp and configured to control an operation of the clamp, a solenoid block configured to apply an air pressure to the air pressure actuator to operate the air pressure actuator, and the wireless magnetic sensor installed in the air pressure actuator and configured to detect an operation state of the air pressure actuator and generate the state information about the jig.

The wireless magnetic sensor may include a magnetic detector configured to detect a current position of the air pressure actuator, detect the operation state of the air pressure actuator from the detected current position, and generate the state information about the jig from the detected operation state, a communicator configured to transmit the state information to the control panel via the first wireless communication, and a battery configured to apply the magnetic detector and the communicator.

The control panel may include a first wireless communicator connected with the wireless magnetic sensor and the gateway via the first wireless communication to transmit or receive the state information about the jig, a second wireless communicator configured to, when the user terminal approaches the control panel within a predetermined distance, connect to the user terminal via third wireless communication to activate a control mode of the control panel through user authentication, and a controller configured to be controlled through the user terminal, generate a control signal to operate the air pressure actuator, and transmit the control signal to the solenoid block.

The first wireless communication may include zigbee communication, the second wireless communication includes wireless-fidelity (Wi-Fi) communication, and the third wireless communication includes bluetooth low energy (BLE) communication.

The gateway may include a first communicator connected with the control panel via the zigbee communication, a second communicator connected with the user terminal via the Wi-Fi communication, and a third communicator connected with the monitoring server via a network transmission protocol including a transmission control protocol/internet protocol (TCP/IP).

According to an embodiment of the present disclosure, a method for remotely controlling a jig using a wireless magnetic sensor comprises detecting a current position of an air pressure actuator, generating state information about the jig, transmitting the state information to a control panel via zigbee communication, transmitting the state information from the control panel to a gateway via the zigbee communication, transmitting the state information from the gateway to a user terminal through Wi-Fi communication, activating a control mode of the control panel through user authentication on the user terminal, controlling the control panel to generate a jig control signal corresponding to the state information, transmitting the jig control signal from the control panel to a solenoid block and applying an air pressure to an air pressure actuator to operate the air pressure actuator.

The method may further comprise receiving the state information from the gateway and storing the state information in a monitoring server, wherein the state information stored in the monitoring server is transmitted to the user terminal.

When a control application installed on the user terminal is executed and the user terminal approaches the control panel within a predetermined distance, the user terminal and the control panel may be connected with each other via BLE communication and the control mode of the control panel may be activated through the user authentication.

Operating the air pressure actuator may include applying the air pressure to the air pressure actuator corresponding to the control signal, operating the air pressure actuator to stop moving or move forwards or rewards by the air pressure, and controlling an operation of a clamp connected with the air pressure actuator.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, embodiments of the present disclosure are described in detail with reference to the accompanying drawings. The same reference denotations may be used to refer to the same or similar elements throughout the specification and the drawings. When determined to make the subject matter of the present disclosure unclear, the detailed description of the known art or functions may be skipped. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
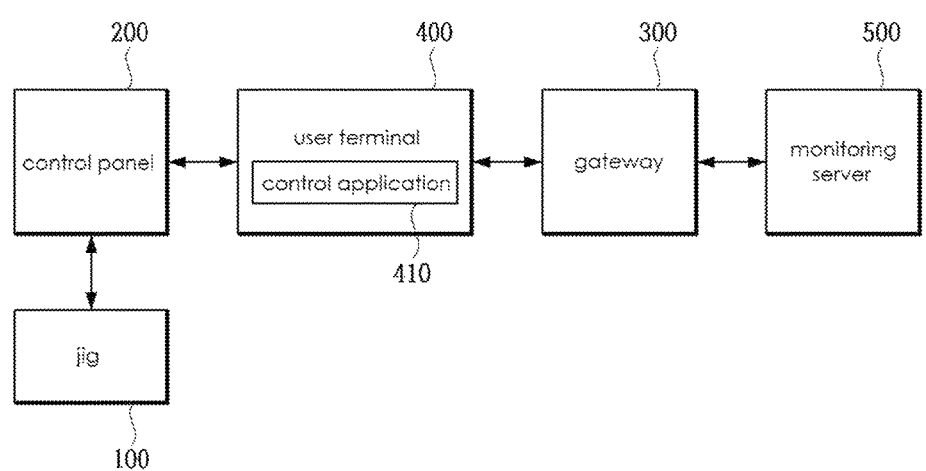
FIG. 1 is a view illustrating a configuration a remote jig control system using a wireless magnetic sensor according to an embodiment of the present disclosure.

FIG. 1 is a view illustrating a configuration a remote jig control system using a wireless magnetic sensor according to an embodiment of the present disclosure.

Referring to FIG. 1, a remote jig control system using a wireless magnetic sensor includes a jig 100, a control panel 200 connected with the jig 100 via first wireless communication to receive state information about the jig 100, a gateway 300 connected with the control panel 200 via the first wireless communication to receive the state information, a user terminal 400 connected with the gateway 300 via second wireless communication to receive the state information, and a monitoring server 500 receiving the state information from the gateway 300 and storing the state information. As used herein, "first wireless communication," "second wireless communication," and "third wireless communication," respectively, may refer to a first wireless communication scheme (protocol or standard), a second wireless communication scheme (protocol or standard), and a third wireless communication scheme (protocol or standard).

The jig 100 may be used for manufacturing cars and may place car bodies to a particular position.

Figure 2:
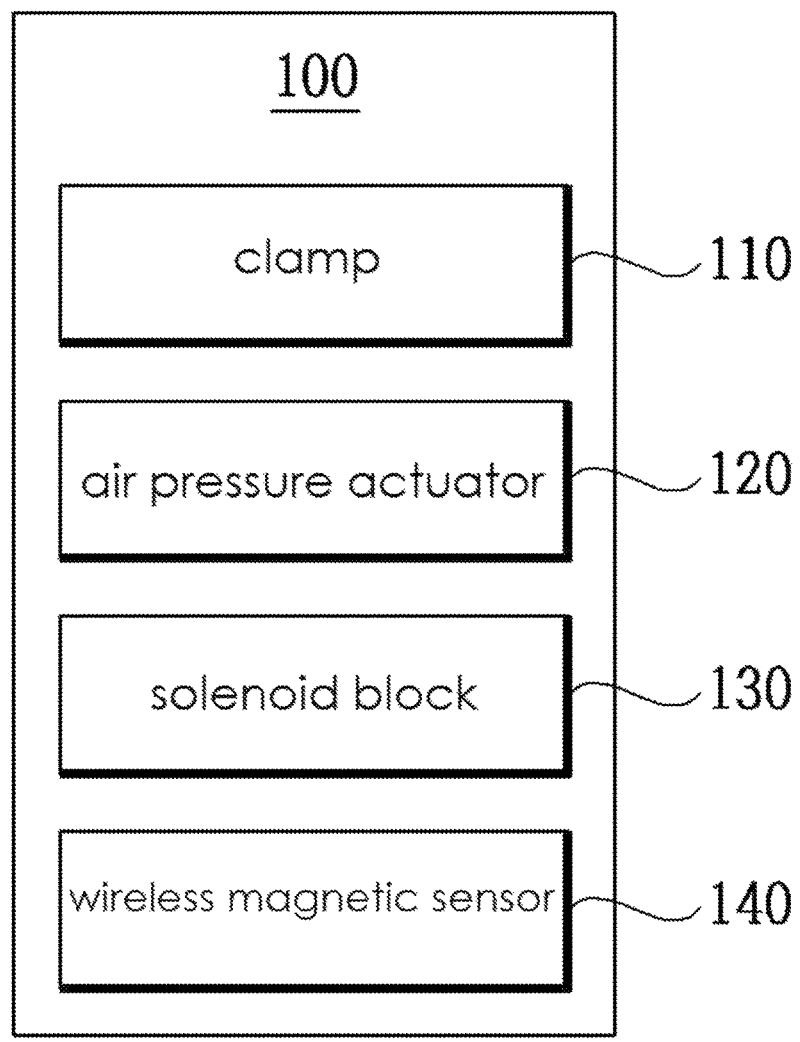
FIG. 2 is a view illustrating a configuration of a jig according to an embodiment of the present disclosure.

FIG. 2 is a view illustrating a configuration of a jig according to an embodiment of the present disclosure.

Referring to FIG. 2, the jig 100 may include a clamp 110, an air pressure actuator 120, a solenoid block 130, and a wireless magnetic sensor 140.

The clamp 110 may clamp or upclamp the car body to or from a particular position to perform processes, e.g., cutting, sheet metal working, or welding, on the car body.

The air pressure actuator 120 may be connected to the clamp 110 to control the operation of the clamp 110.

For example, the air pressure actuator 120 is moved forwards or backwards by an air pressure from the solenoid block 130, controlling the operation of the clamp 110.

The solenoid block 130 applies an air pressure to the air pressure actuator 120, operating the air pressure actuator 120.

The wireless magnetic sensor 140 may be installed on the air pressure actuator 120 and detect the state of operation of the air pressure actuator 120 to generate state information about the jig 100. The wireless magnetic sensor 140 may have an arched surface that is to be attached onto the air pressure actuator 120, allowing the wireless magnetic sensor 140 to easily be attached to the air pressure actuator 120 that may have a cylindrical shape.

The wireless magnetic sensor 140 may be configured of a lead switch that may be placed in a ferromagnetic glass pipe and that may perform switching depending on the strength of magnetic energy applied from the outside.

According to the present disclosure, according to the present disclosure, unlike in the conventional art where a wired magnetic sensor is adopted, a wireless magnetic sensor as set forth above is adopted to address issues that may arise from use of a wired magnetic sensor, such as inconvenient wiring and frequent replacement due to wire disconnections.

Figure 3:
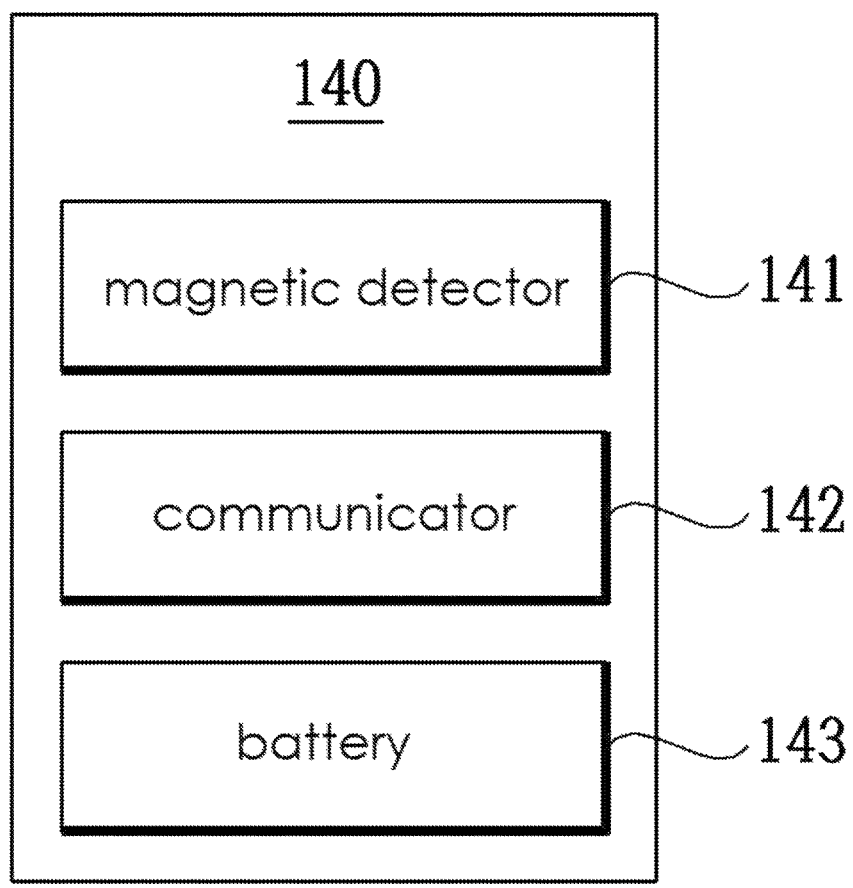
FIG. 3 is a view illustrating a configuration of a wireless magnetic sensor according to an embodiment of the present disclosure.

FIG. 3 is a view illustrating a configuration of a wireless magnetic sensor according to an embodiment of the present disclosure.

Referring to FIG. 3, the wireless magnetic sensor 140 may include a magnetic detector 141, a communicator 142, and a battery 143.

The communicator 142 may be a transmitter, a receiver, or a transceiver that may transmit or receive signals, data, or information.

The magnetic detector 141 may detect the current position of the air pressure actuator 120, detect the operation state of the air pressure actuator 120 in the detected current position, and generate the state information about the jig 100 from the detected operation state.

For example, the magnetic detector 141 may detect the current position of the air pressure actuator 120 to thereby detect the operation state of the air pressure actuator 120, e.g., whether the air pressure actuator 120 is moving forwards or backwards. The magnetic detector 141 may also generate state information about the jig 100 corresponding to the operation state. The state information may be, e.g., information about whether the clamp 110 clamps the car body to a particular position or unclamps the car body from the particular position.

The communicator 142 may send the jig state information generated by the magnetic detector 141 through first wireless communication to the control panel 200.

For example, the first wireless communication may be zigbee communication.

The battery 143 may supply power to the magnetic detector 141 and the communicator 142 to operate the magnetic detector 141 and the communicator 142.

The control panel 200 may be connected with the wireless magnetic sensor 140 via the first wireless communication to receive state information about the jig 100 from the wireless magnetic sensor 140. The control panel 200 may be controlled through the user terminal 400 to generate a jig control signal corresponding to the state information.

For example, the control panel 200 may be connected with the communicator 142 via the first wireless communication, e.g., zigbee communication, to receive the state information about the jig 100 and may transmit the received state information to the gateway 300.

The control panel 200 may be controlled through the user terminal 400 to generate jig control signals and may transmit the control signals to the solenoid block 130 combined with the control panel 200 to control the jig 100.

For example, the control panel 200 may be combined with the solenoid block 130 and may be installed in the jig 100.

Figure 4:
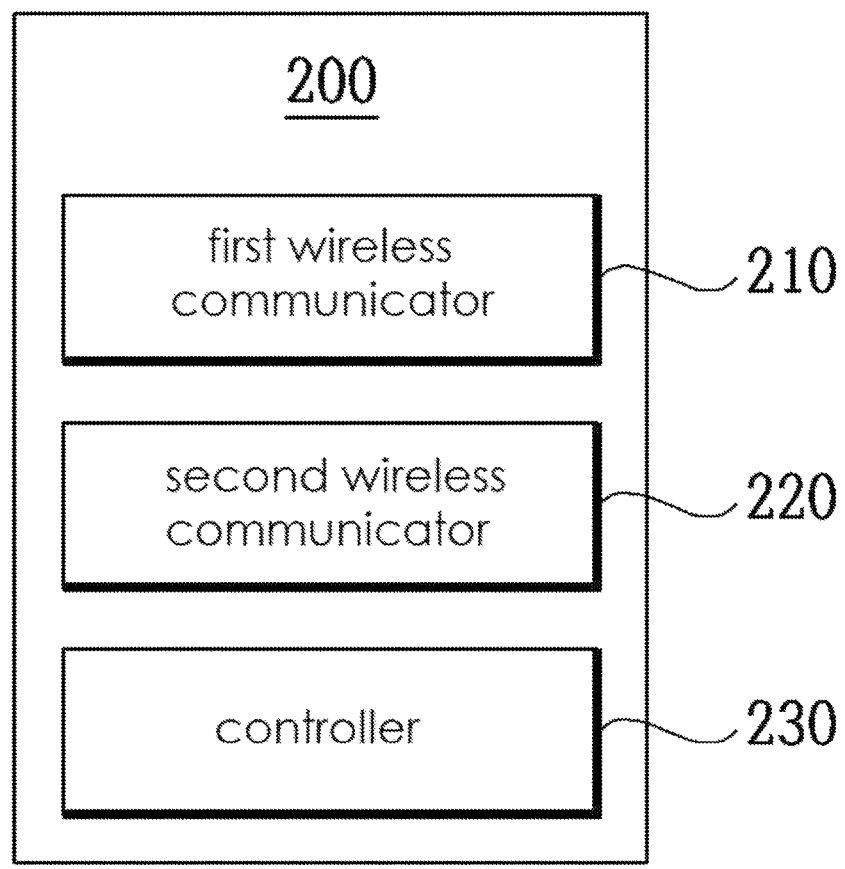
FIG. 4 is a view illustrating a configuration of a control panel according to an embodiment of the present disclosure.

FIG. 4 is a view illustrating a configuration of a control panel according to an embodiment of the present disclosure.

Referring to FIG. 4, the control panel 200 may include a first wireless communicator 210, a second wireless communicator 220, and a controller 230.

The first wireless communicator 210 may be a transmitter, a receiver, or a transceiver that may wirelessly transmit or receive signals, data, or information.

The second wireless communicator 220 may be a transmitter, a receiver, or a transceiver that may wirelessly transmit or receive signals, data, or information.

The first wireless communicator 210 may be connected with the wireless magnetic sensor 140 and the gateway 300 via the first wireless communication to transmit and receive jig state information.

For example, the first wireless communicator 210 may be connected with the communicator 142 via the first wireless communication, e.g., zigbee communication, to receive the state information about the jig 100 from the communicator 142, and the first wireless communicator 210 may be communicated with the gateway 300 via the first wireless communication, e.g., zigbee communication, to transmit the state information.

The second wireless communicator 220 may connect the control panel 200 with the user terminal 400 via third wireless communication, activating a control mode of the control panel 200 after user authentication.

For example, where a control application 410 is executed on the user terminal 400 and the user terminal 400 approaches the control panel 200 within a predetermined distance, the second wireless communicator 220 may be connected with the user terminal 400 via the third wireless communication, e.g., bluetooth low energy (BLE) communication, to activate the control mode of the control panel 200 when the user is authenticated.

The controller 230 may be controlled through the user terminal 400 to generate a control signal, corresponding to the state information, to operate the air pressure actuator 120 and may transmit the control signal to the solenoid block 130.

The solenoid block 130 may operate the air pressure actuator 120 corresponding to the control signal. For example, according to the control signal, the solenoid block 130 may stop the operation of, or move forwards or backwards, the air pressure actuator 120, thereby controlling the operation of the jig 100.

Here, the controller 230 may include a microcontrol unit (MCU) capable of controlling the solenoid block 130 and a relay, e.g., a 24 VDC voltage relay. The control panel 200 may further include a battery (not shown) that may supply power to the first wireless communicator 210, the second wireless communicator 220, and the controller 230 to operate the first wireless communicator 210, the second wireless communicator 220, and the controller 230. The battery may be a 24 VDC battery.

The gateway 300 may be connected with the control panel 200 via the first wireless communication and with the user terminal 400 via the second wireless communication. The gateway 300 may be connected with the monitoring server 500 through a network transmission protocol to transmit and receive the jig state information.

For example, the gateway 300 may be converter that may convert data received through the first wireless communication into data that may be transmitted through the second wireless communication.

For example, where the user terminal 400 may not directly receive jig state information through the first wireless communication from the wireless magnetic sensor 140 and the control panel 200, the gateway 300 may convert the jig state information, which is transmitted or received through the first wireless communication, into jig state information which may be transmitted or received through the second wireless communication and send the converted jig state information to the user terminal 400 via the second wireless communication.

Figure 5:
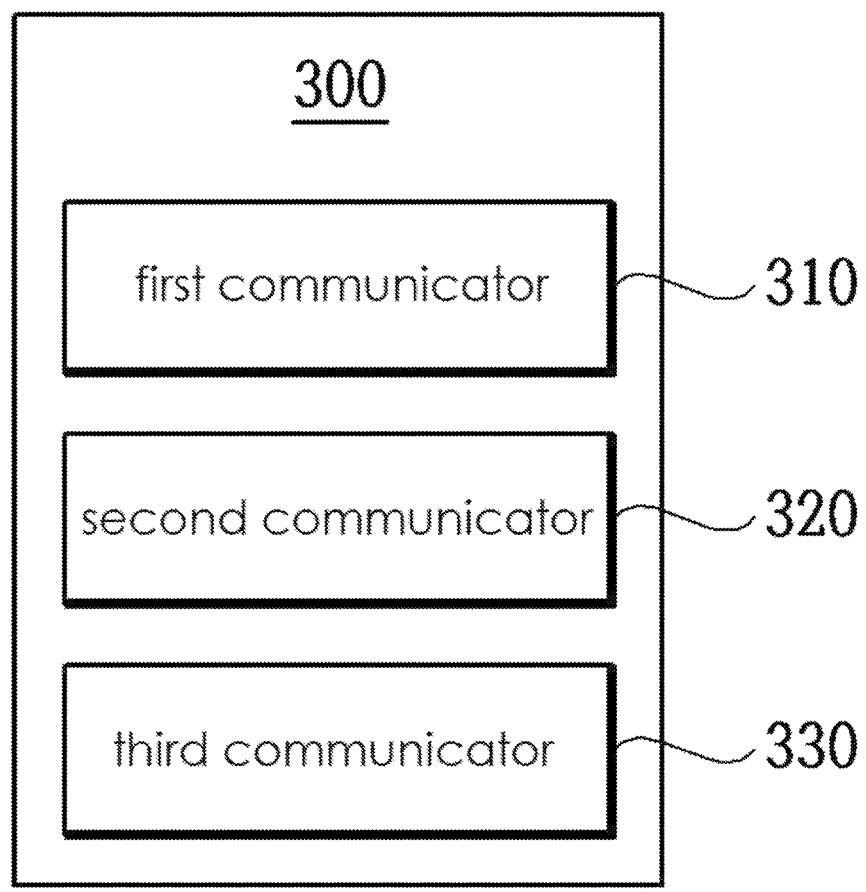
FIG. 5 is a view illustrating a configuration of a gateway according to an embodiment of the present disclosure.

FIG. 5 is a view illustrating a configuration of a gateway according to an embodiment of the present disclosure.

The gateway 300 may include a first communicator 310, a second communicator 320, and a third communicator 330.

The first communicator 310 may be connected with the control panel 200 via the first wireless communication.

For example, the first communicator 310 may be connected with the first wireless communicator 210 of the control panel 200 via the first wireless communication, e.g., zigbee communication, to receive the state information about the jig 100 from the first wireless communicator 210.

The second communicator 320 may be connected with the user terminal 400 via the second wireless communication.

For example, the second communicator 320 may be connected with the user terminal 400 via the second wireless communication, e.g., wireless-fidelity (Wi-Fi) communication, to transmit the jig state information which is received from the first communicator 310 through the zigbee communication, to the user terminal 400.

The third communicator 330 may be connected with the monitoring server 500 through a network transmission protocol.

For example, the network transmission protocol may be the transmission control protocol/internet protocol (TCP/IP). The third communicator 330 may be connected with the monitoring server 500 through the TCP/IP to transmit the jig state information which is received from the first communicator 310 via the zigbee communication, to the monitoring server 500.

For example, the gateway 300, the control panel 200, and the wireless magnetic sensor 140 may be a coordinator, a router, and an end device, respectively, which may be components of a zigbee network, and may be configured to send the state information about the jig 100 to the user terminal 400 based on zigbee communication.

The user terminal 400 may be connected with the gateway 300 via the second wireless communication, e.g., Wi-Fi communication, to receive the state information.

For example, the user terminal 400 may receive, through the gateway 300, the jig state information stored in the monitoring server 500 and may display the jig state information, allowing the user to monitor the state of the jig.

For example, where the control application 410 is running on the user terminal 400 and the user terminal 400 approaches the control panel 200 within a predetermined distance, the user terminal 400 may be connected with the second wireless communicator 220 of the control panel 200 via the third wireless communication, e.g., BLE communication, activating the control mode of the control panel 200 when the user is authenticated.

While the control mode is active, the user terminal 400 may control the controller 230 of the control panel 200 to generate a control signal to operate the air pressure actuator 120, as a signal to control the jig 100 corresponding to the jig state information, and send the control signal to the solenoid block 130.

For example, where the jig state information received indicates that the clamp 110 clamps the car body, the user terminal 400 may generate a control signal to enable the clamp 110 to unclamp the car body through the controller 230 and transmit the control signal to the solenoid block 130.

For example, where the jig state information received indicates that the clamp 110 unclamps the car body, the user terminal 400 may generate a control signal to enable the clamp 110 to clamp the car body through the controller 230 and transmit the control signal to the solenoid block 130.

The monitoring server 500 may be connected with the third communicator 330 of the gateway 300 through the network transmission protocol, e.g., the TCP/IP, and may receive the jig state information, which has been received from the first communicator 310 via zigbee communication, and store the jig state information.

Figure 6:
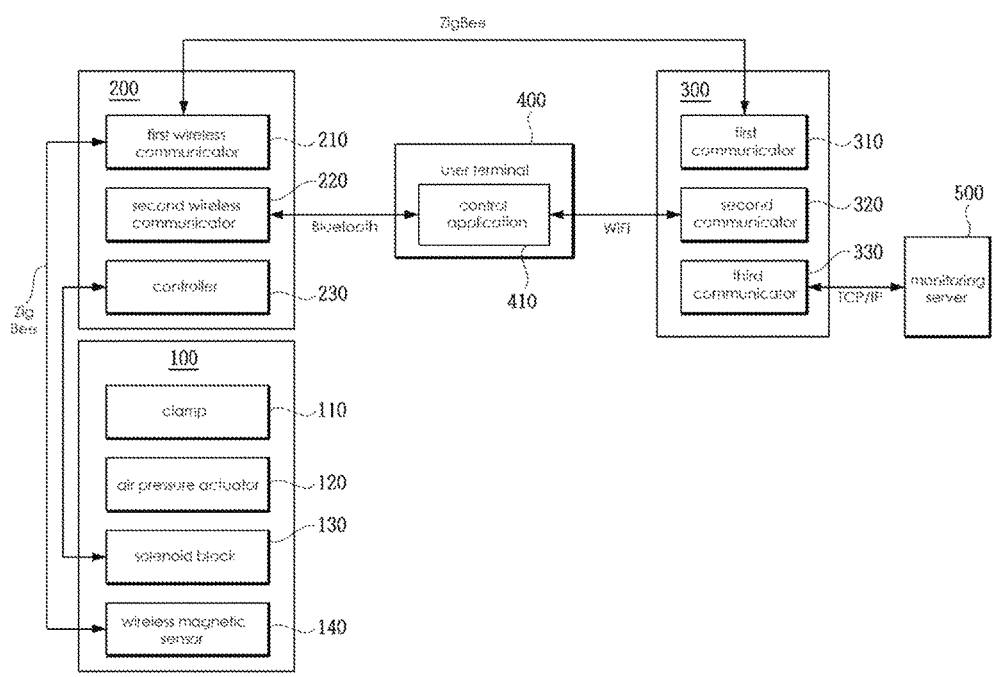
FIG. 6 is a view illustrating a configuration of a remote jig control system with network connections according to an embodiment of the present disclosure.

FIG. 6 is a view illustrating a configuration of a remote jig control system with network connections according to an embodiment of the present disclosure.

Referring to FIG. 6, according to an embodiment of the present disclosure, in the remote jig control system, the wireless magnetic sensor 140 of the jig 100, the first wireless communicator 210 of the control panel 200, and the first communicator 310 of the gateway 300 may be mutually connected via zigbee communication, and the second communicator 320 of the gateway 300 and the user terminal 400 may be connected with each other via Wi-Fi communication to provide jig state information generated from the wireless magnetic sensor 140 to the user terminal 400, allowing the user to remotely monitor the state of the jig.

In this system, where the user terminal 400 approaches the control panel 200 within a predetermined distance, the second wireless communicator 220 of the control panel 200 and the user terminal 400 may be connected with each other via BLE communication so that the controller 230 of the control panel 200 may be controlled through the user terminal 400, generating a signal to control the jig 100. The control signal may be sent to the solenoid block 130, operating the air pressure actuator 120 and thus controlling the jig 100.

Described below is a method for remotely controlling a jig using a wireless magnetic sensor according to an embodiment of the present disclosure.

Figure 7:
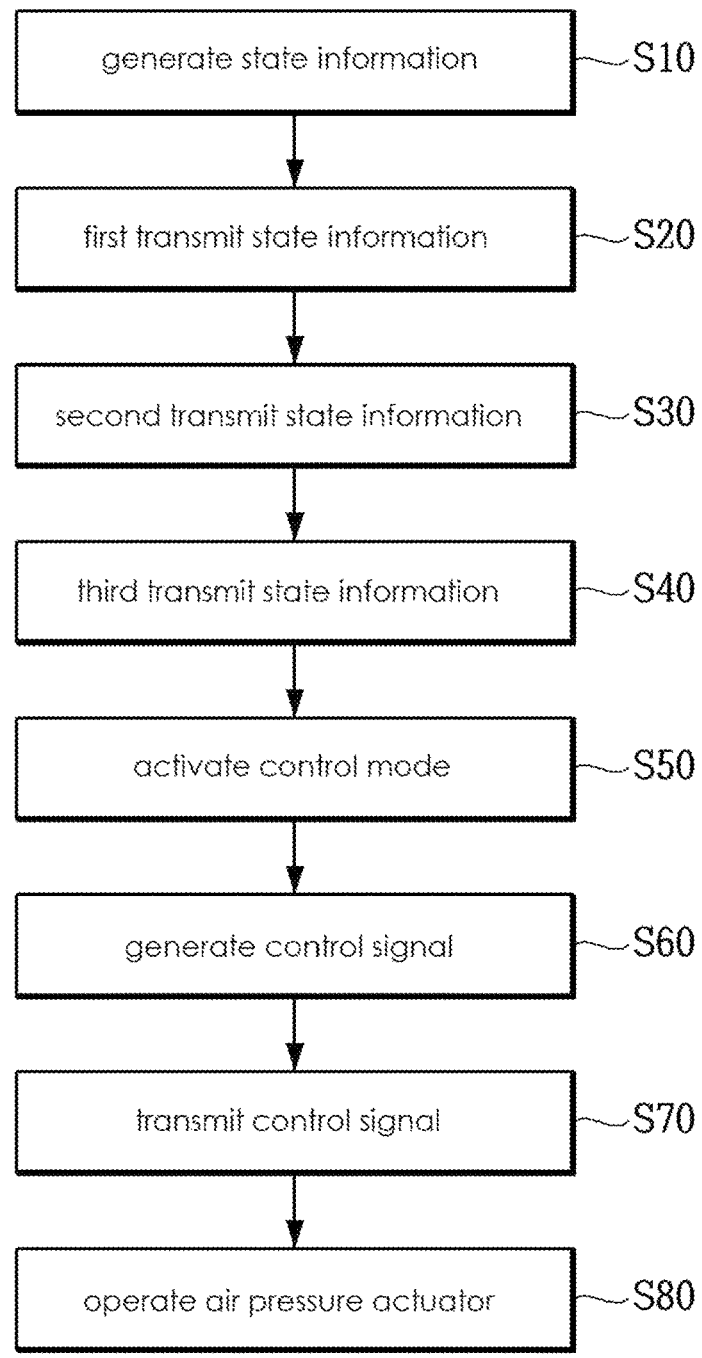
FIG. 7 is a flowchart illustrating a remote jig control method using a wireless magnetic sensor according to an embodiment of the present disclosure.

FIG. 7 is a flowchart illustrating a remote jig control method using a wireless magnetic sensor according to an embodiment of the present disclosure.

Referring to FIG. 7, a method for remotely controlling a jig using a wireless magnetic sensor, according to an embodiment of the present disclosure, includes a state information generation step S10, a first state information transmission step S20, a second state information transmission step S30, a third state information transmission step S40, a control mode activation step S50, a control signal generation step S60, a control signal transmission step S70, and an air pressure actuator operation step S80.

In the state information generation step S10, the wireless magnetic sensor 140 may detect the current position of the air pressure actuator 120 and generate state information about the jig 100.

For example, in the state information generation step S10, the magnetic detector 141 may detect the current position of the air pressure actuator 120 to thereby detect the operation state of the air pressure actuator 120, e.g., whether the air pressure actuator 120 is moving forwards or backwards. The magnetic detector 141 may also generate state information about the jig 100 corresponding to the operation state. The state information may be, e.g., information about whether the clamp 110 clamps the car body to a particular position or unclamps the car body from the particular position.

In the first state information transmission step S20, the wireless magnetic sensor 140 may transmit the jig state information to the control panel 200 via zigbee communication.

For example, in the first state information transmission step S20, the communicator 142 may send the jig state information generated by the magnetic detector 141 through zigbee communication to the first wireless communicator 210.

In the second state information transmission step S30, the control panel 200 may transmit the jig state information to the gateway 300 via zigbee communication.

For example, in the second state information transmission step S30, the first wireless communicator 210 may send the jig state information through zigbee communication to the first communicator 310.

In the third control information transmission step S40, the gateway 300 may transmit the jig state information to the user terminal 400 via Wi-Fi communication.

For example, in the third state information transmission step S40, the second communicator 320 may transmit the jig state information, which has been received from the first communicator 310 via the zigbee communication, to the user terminal 400 via the Wi-Fi communication.

In the control mode activation step S50, the user terminal 400 may activate the control mode of the control panel 200 through user authentication. For example, the user terminal 400 may activate the control mode of the control panel 200 when the user of the user terminal 400 is authenticated.

For example, in the control mode activation step S50, where the control application 410 installed on the user terminal 400 is executed and the user terminal 400 approaches the control panel 200 within a predetermined distance, the user terminal 400 and the control panel 200 may be connected with each other via BLE communication, activating the control mode of the control panel 200 through user authentication.

In the control signal generation step S60, the user terminal 400 may control the control panel 200, generating a jig control signal corresponding to the jig state information.

For example, in the control signal generation step S60, the user terminal 400 may control the controller 230 of the control panel 200, generating a control signal to operate the air pressure actuator 120, as a jig control signal corresponding to the jig state information.

For example, in the control signal generation step S60, where the user terminal 400 receives the jig state information indicating that the clamp 110 clamps a car body, the user terminal 400 may generate a control signal to enable the clamp 110 to unclamp the car body through the controller 230, or otherwise where the user terminal 400 receives the jig state information indicating that the clamp 110 unclamps a car body, the user terminal 400 may generate a control signal to enable the clamp 110 to clamp the car body through the controller 230.

In the control signal transmission step S70, the control panel 200 may transmit the jig control signal to the solenoid block 130.

For example, in the control signal transmission step S70, the controller 230 of the control panel 200 may transmit the control signal to the solenoid block 130 which is combined with the control panel 200.

In the air pressure actuator operation step S80, the solenoid block 130 may apply an air pressure to the air pressure actuator 120, operating the air pressure actuator 120.

Figure 9:
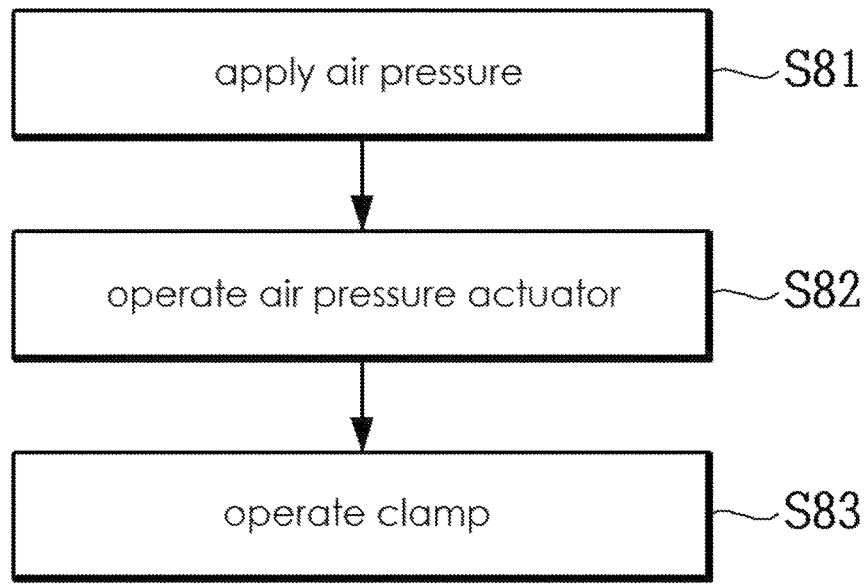
FIG. 9 is a flowchart illustrating a process for operating an air pressure actuator according to an embodiment of the present disclosure.

FIG. 9 is a flowchart illustrating a process for operating an air pressure actuator according to an embodiment of the present disclosure.

For example, according to an embodiment of the present disclosure, the air pressure actuator operation step S80 may include an air pressure application step S81, an actuator operation step S82, and a clamp operation step S83, as shown in FIG. 9.

In the air pressure application step S81, the solenoid block 130 may apply an air pressure to the air pressure actuator 120 corresponding to the jig control signal.

In the actuator operation step S82, the air pressure actuator 120 may be operated by the air pressure and may thus be stopped or moved forwards or backwards.

In the clamp operation step S83, as the air pressure actuator 120 is operated, the clamp 110 connected with the air pressure actuator 120 is controlled for its operation.

Figure 8:
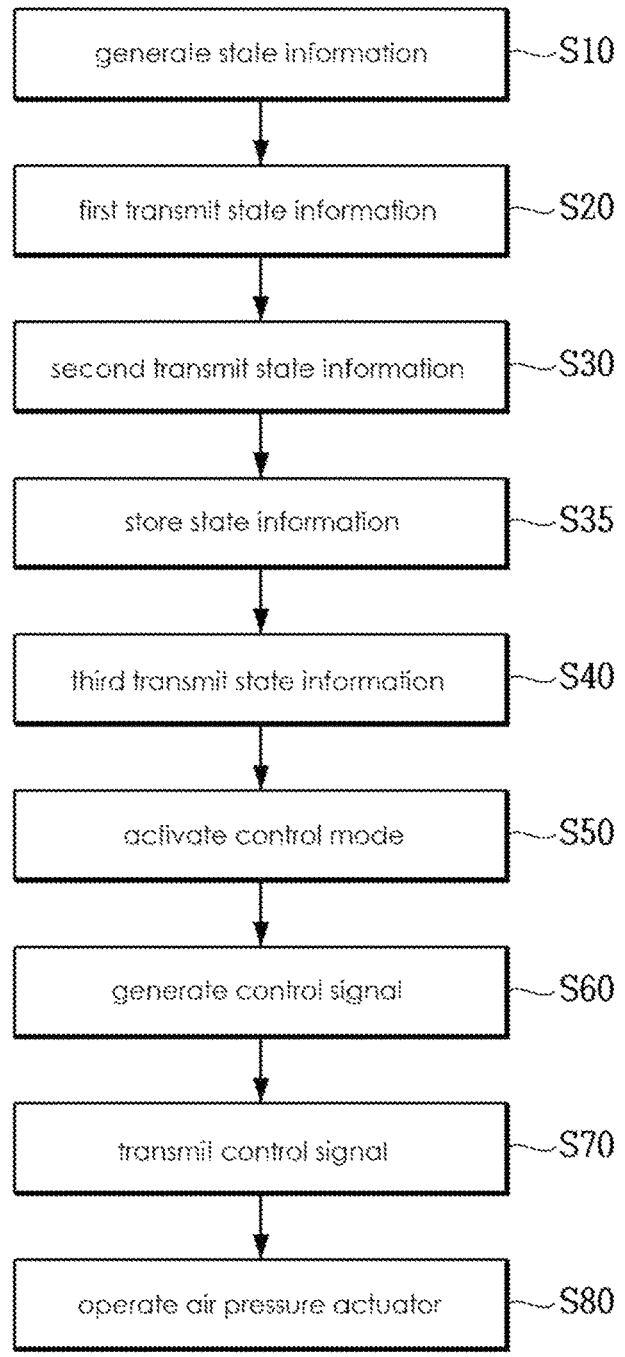
FIG. 8 is a flowchart illustrating a remote jig control method using a wireless magnetic sensor according to an embodiment of the present disclosure.

FIG. 8 is a flowchart illustrating a remote jig control method using a wireless magnetic sensor according to an embodiment of the present disclosure.

Referring to FIG. 8, according to an embodiment of the present disclosure, the method for remotely controlling a jig using a wireless magnetic sensor may further include a state information storing step S35 between the second state information transmission step S30 and the third state information transmission step S40. In the state information storing step S35, the monitoring server 500 may receive the jig state information from the gateway 300 and store the state information.

For example, in the state information storing step S35, the monitoring server 500 may receive the state information, which is received via zigbee communication from the first communicator 310, from the third communicator 330 of the gateway 300 through the network transmission protocol (e.g., the TCP/IP) and store the state information.

In the third state information transmission step S40, the gateway 300 may receive the jig state information stored in the monitoring server 500 through the network transmission protocol (e.g., the TCP/IP) and may then send the state information to the user terminal 400 via Wi-Fi communication.

According to various embodiments of the present disclosure, there may be provided a remote jig control system and method using a wireless magnetic sensor that enables a remote monitoring of jigs used for automobile production using a user terminal and controlling a control panel using the user terminal, efficiently managing the automobile production process.

According to various embodiments of the present disclosure, there may be provided a remote jig control system and method using a wireless magnetic sensor that may address the inconvenient wiring, wire disconnections, and frequent sensor exchange that may arise when using wired magnetic sensors.

According to various embodiments of the present disclosure, there may be provided a remote jig control system and method using a wireless magnetic sensor that may lead to cost savings by eliminating the need for an HW panel and PLC box that would conventionally be used to control jigs.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims.

What is claimed is:

1. A remote jig control system, comprising:
a jig configured to place a car body to a particular position, a wireless magnetic sensor installed in the jig;
a control panel wirelessly connected with the wireless magnetic sensor via first wireless communication, which is ZIGBEE (IEEE 802.15.4 or wireless ad hoc network or low power consumption limits transmission distances to 10-100 meters), to receive state information about the jig from the wireless magnetic sensor;
a gateway connected with the control panel via the first wireless communication to receive the state information;
a user terminal wirelessly connected with the gateway via second wireless communication, which is wireless-fidelity (Wi-Fi) communication, to receive the state information and wirelessly connected with the control panel via third wireless communication, which is BLUETOOTH (IEEE 802.15.1 or 2.400 to 2.485 GHz), to control the control panel; and
a monitoring server configured to receive the state information from the gateway and store the state information, wherein the control panel is configured to be controlled through the user terminal to generate a jig control signal corresponding to the state information, wherein when a control application installed on the user terminal is executed and the user terminal approaches the control panel within a predetermined distance, the user terminal and the control panel are connected with each other via BLE communication and the control mode of the control panel is activated through the user authentication.

2. The remote jig control system of claim 1, wherein the user terminal is configured to receive, through the gateway, the state information stored in the monitoring server and display a state of the jig.

3. The remote jig control system of claim 2, wherein the jig includes a clamp configured to clamp the car body, an air pressure actuator connected with the clamp and configured to control an operation of the clamp, a solenoid block configured to apply an air pressure to the air pressure actuator to operate the air pressure actuator, and the wireless magnetic sensor installed in the air pressure actuator and configured to detect an operation state of the air pressure actuator and generate the state information about the jig.

4. The remote jig control system of claim 3, wherein the wireless magnetic sensor includes a magnetic detector configured to detect a current position of the air pressure actuator, detect the operation state of the air pressure actuator from the detected current position, and generate the state information about the jig from the detected operation state, a communicator configured to transmit the state information to the control panel via the first wireless communication, and a battery configured to apply the magnetic detector and the communicator.

5. The remote jig control system of claim 4, wherein the control panel includes a first wireless communicator connected with the wireless magnetic sensor and the gateway via the first wireless communication to transmit or receive the state information about the jig, a second wireless communicator configured to, when the user terminal approaches the control panel within a predetermined distance, connect to the user terminal via the third wireless communication to activate a control mode of the control panel through user authentication, and a controller configured to be controlled through the user terminal, generate a control signal to operate the air pressure actuator, and transmit the control signal to the solenoid block.

6. The remote jig control system of claim 1, wherein the gateway includes a first communicator connected with the control panel via the ZIGBEE (IEEE 802.15.4 or wireless ad hoc network or low power consumption limits transmission distances to 10-100 meters, a second communicator connected with the user terminal via the wireless-fidelity (Wi-F) communication, and a third communicator connected with the monitoring server via a network transmission protocol including a transmission control protocol/Internet protocol (TCP/IP).

7. A method for remotely controlling a jig using a wireless magnetic sensor, the method comprising:
  detecting a current position of an air pressure actuator;
  generating state information about the jig;
  transmitting the state information from a wireless magnetic sensor to a control panel via ZIGBEE (IEEE 802.15.4 or wireless ad hoc network or low power consumption limits transmission distances to 10-100 meters);
  transmitting the state information from the control panel to a gateway via the ZIGBEE (IEEE 802.15.4 or wireless ad hoc network or low power consumption limits transmission distances to 10-100 meters);
  transmitting the state information from the gateway to a user terminal through wireless-fidelity (Wi-Fi) communication, the user terminal wirelessly connected with the control panel via BLUETOOTH (IEEE 802.15.1 or 2.400 to 2.485 GHz) to control the control panel when a control application installed on the user terminal is executed and the user terminal approaches the control panel within a predetermined distance;
  activating a control mode of the control panel through user authentication on the user terminal;
  controlling the control panel to generate a jig control signal corresponding to the state information; and
  transmitting the jig control signal from the control panel to a solenoid block; and
  applying an air pressure to an air pressure actuator to operate the air pressure actuator.

8. The method of claim 7, further comprising receiving the state information from the gateway and storing the state information in a monitoring server, wherein the state information stored in the monitoring server is transmitted to the user terminal.

9. The method of claim 7, wherein operating the air pressure actuator includes applying the air pressure to the air pressure actuator corresponding to the control signal, operating the air pressure actuator to stop moving or move forwards or rewards by the aft pressure, and controlling an operation of a clamp connected with the air pressure actuator.

* * * * *